3,597,252
METHOD FOR PRODUCING GLASS COMPOSITIONS
Hubert Schröder, Wiesbaden, and Georg Gliemeroth, Mainz-Mombach, Germany, assignors to JENAer Glaswerk Schott & Gen., Mainz, Germany
No Drawing. Filed May 4, 1967, Ser. No. 637,051
Claims priority, application Germany, May 7, 1966, J 30,783
Int. Cl. C03c 3/04; C03b 1/00
U.S. Cl. 106—52     7 Claims

ABSTRACT OF THE DISCLOSURE

There are disclosed $SiO_2$ containing glasses characterised by high melting points and low thermal expansion coefficients and a process for preparing them utilizing temperatures substantially lower than heretofore operable with $SiO_2$ containing glass compositions. The process involves employing the $SiO_2$ or another principal component of the glass in the form of a liquid organic compound, as for instance, in the form of its alcoholate. The liquid component or components are mixed together and/or with any non-liquid components, hydrolyzed and gelled. The resulting mass is then subjected to the action of heat to form a completely homogeneous oxidic molded glass body characterized by the aforenoted properties.

---

The invention relates to glass having a high melting point and a low coefficient of expansion. More particularly this invention relates to a process for manufacturing $SiO_2$ containing glasses having high melting points and low thermal expansion coefficients at temperatures substantially lower than those required heretofore in preparing glasses from mixtures of inorganic components.

Glasses having high contents of silicic acid are very important in many applications because of their low thermal coefficients of expansion. However, the manufacture of such glasses entails great difficulty as a result of their high melting temperatures.

Thus it has already been proposed to manufacture glasses containing 89.6 to 84.7 wt. percent $SiO_2$ and 5.3 to 10.4 wt. percent $TiO_2$ from a mixture of the tetrachlorides of silicon and titanium by heating the mixture in an oxyacetylene burner to temperatures in excess of 1800° C. and thereafter burning onto a support. The thermal expansion coefficient ($\alpha \times 10^{-7}/°$ C.) lies between —0.1 and +2.1, depending on the composition. This process is very expensive and the mixture of the tetrachlorides in the burner is reproducible only with difficulty.

It is also known in the prior art to fuse glasses having high silicic acid contents in a crucible made of a highly refractory material, this being accomplished on the basis of known high temperature melting processes, such glasses containing, for example 80–95.4 wt. percent $SiO_2$, 0–10 wt. percent $ThO_2$, 0–10 wt. percent $CeO_2$, 0–7 wt. percent BeO, 0–3 wt. percent $ZrO_2$, 0–3 wt. percent CaO, and 0–0.7 wt. percent NaO, or 95–99.9 wt. percent $SiO_2$, 0–5 wt. percent $Ta_2O_5$, and 0–5 wt. percent $Nb_2O_5$. In the aforesaid processes, however, temperatures above 1700° C. are required. At lower temperatures, glasses having low thermal expansion coefficients and silica contents higher than 90% by weight cannot be made at all or only of a very poor quality from the starting oxides or inorganic salts. The products that can be made by this crucible melting process can be produced only in small quantities, so that production on a technical scale is clearly out of the question.

It is accordingly an object of the invention to provide a process for manufacturing glasses having high melting temperatures and low thermal expansion coefficients avoiding the disadvantages associated with the processes as heretofore practiced.

It is another object of the invention to provide a process for manufacturing glasses having high melting temperatures and low thermal expansion coefficients utilizing therein temperatures substantially lower than those heretofore employed in manufacturing glasses from mixtures of inorganic components.

A further object of the invention is to provide new glasses having high melting temperatures and low thermal expansion coefficients on the basis of compositions having high $SiO_2$ contents.

Other objects and various features of novelty and invention will be pointed out or will occur to those skilled in the art from a reading of the following specification.

As used herein the term "customary melting temperature" is meant to designate the temperature as required in the manufacture of glasses from mixtures of inorganic components.

It is already known in the art that silicon dioxide can be obtained in the form of thin, vitreous coatings thereof by starting with an ester of silicic acid and converting the ester by hydrolysis into a colloidal silicic acid gel. However, it has not been possible hitherto to produce technicaly usable molded bodies in this manner.

The problem of obtaining such bodies has been solved according to the invention, it now having been found that if at least one of the principal components of the glass is utilized in the form of a liquid or dissolved organic compound, and the liquid component or components are admixed with any other component of the glass and the same thereafter hydrolyzed, formed into a gel, and then subjected to the action of heat, the mixture is converted into an oxidic molded body. In the practice of the method of the invention only relatively low temperatures are necessary, and glasses of great homogeneity are obtained, since the homogeneous distribution of all components is much greater than when a mixture consisting of solid granules is employed.

If a glass is to be manufactured having a thermal expansion coefficient that is lower than that of pure silica glass, or of a silica glass containing $TiO_2$, the usual mixture of ingredients cannot be used because of the high melting temperatures of $SiO_2$ (approx. 1713° C.) and of the $TiO_2$ (1830° C.) It has therefore been necessary to find a method of glass manufacture whereby it is possible to carry out the melting process at a lower temperature. This is accomplished according to the invention by undertaking an optimum intermixture of the individual components substantially down to the atomic level, prior to the actual melting process.

According the to process of the invention, this degree of intermixture is achieved by mixing the principal components in the form of liquid organic compounds, for example, in the form of alcoholates. The alcoholate mixture is then hydrolyzed and transformed into a gel. The hydroxides in the gel are brought by the action of heat through the corresponding oxyhydrates into their oxide form. In this manner the second difficulty is simultaneously overcome which arises especially in the manufacture of glasses of high silicic acid content, namely the requirement for high melting temperatures, since, if appropriate measures are taken in the mixing of the liquid starting substances, the intermixture of the oxyhydrates reaches the atomic level. Furthermore, the oxygen bridge bonds, at least in part, can close during the conversion from the oxyhydrate to the oxide phase, so that not all of the establishment of the oxygen bridge bonds will take place in the molten phase. The metal alcoholates have proven particularly suitable as starting materials for the manufacturing process in accordance with the invention and therefore represent the preferred form for use herein. Equally satisfactory results can also be obtained if different hydrolyzable organic compounds such as for example, metal-halogen alcoholates or corresponding esters or other such compounds are used as at least one of the components. The important thing in selecting the starting components is that at least one principal component must be able to be hydrolyzed. If it is desired to introduce into the glass metal compounds which do not undergo hydrolysis, the possibility exists of incorporating them into the gel in dissolved form with the water needed for the hydrolysis or in other such form.

The gel that develops is converted to the oxide form by for example the following procedure: The gel is comminuted to a diameter of 0.5 cm. max. and boiled in acidified water. This is followed by a slow and careful drying, until the intermediate product is completely degassed. The material is brought to the reaction temperature, held for a while at this temperature, and then cooled off. The dense block of material which is thereby formed is then cut according to the requirements and dimensions of the formed objects to be made. This material, which is bubble-free or contains very fine bubbles, depending on the manner in which the process was conducted and on the starting material, can be cut, ground and polished without difficulty.

The amount of the bubbles contained in the product depends to a great extent on how the drying process is carried out as a result of which the hydrogel is converted to the oxide. The more the oxyhydrate intermediate product can be degassed using therefor temperatures at which its sintering does not take place, the smaller will be the amount of the bubbles be in the product after the heating process.

It is possible in accordance with the invention to vary the process in many different ways:

The hydrolysis process described above can be carried out discontinuously. For example, if silicon tetramethylate and titanium tetrabutylate are employed as the starting materials the gel formation is spontaneous. The gel solidifies in a very short time. At the critical moment in the gel formation, at which an augmented water input would actually be required in order to eliminate the last remnants of the alcohol, the water input has to be halted and the agitator withdrawn from the stiffening gel. Consequently a considerable amount of residual alcohol remains in the gel. The alcohol content can be further reduced by increasing the temperature.

In order to carry out the hydrolysis process in a continuous fashion and to provide a simpler way of eliminating residual alcohol, the hydrolysis is stopped shortly before gelation. By combining the comminution process (in the form of a micronization) with the final hydrolysis, the gel is immediately destroyed again and the hydrolysis is forced to continue, so that less residual alcohol remains in the gel and production can be completed by decantation, drying and subjecting to the action of heat.

A further variation of the process lies in the possibility of not limiting the degasification of the hydroxide-to-oxyhydrate intermediate product to only the drying process as just described. An additional vacuum treatment or vacuum-pressure treatment can be employed and offers the possibility of manufacturing a bubble-free product. For example, a heat treatment in a vacuum furnace results in a substantially more rapid degasification of the oxyhydrate. It is also important in this case that the material be subjected to vacuum at a temperature below the sintering level for a sufficient period that it becomes entirely degassed. The temperature elevation that follows results in the fusion which gives rise to the finished product. In the case of the above-mentioned example of the mixture of silicon tetramethylate and titanium tetrabutylate, this degasification temperature amounts to 1220° C. The evacuation is continued until the pressure of $2 \times 10^{-2}$ torr remains constant. When other starting substances are used, such as titanium dichlorodiethylate, which under certain circumstances produces a desirable retardation of the hydrolysis, tiny bubbles may still be contained in the end product. To make then even smaller, a pressure process can follow the vacuum process, in which connection pressures of 4 atmospheres, for example, can be used.

In a number of applications it is desired to have as light a material as possible having a thermal expansion coefficient close to zero. In such cases it is advantageous to produce a product containing fine bubbles by the process above described. A finely porous surface is out of the question where intended for use as a mirror material, and yet it is possible in various ways to treat a finely porous surface in such a manner that an optical polish can be produced thereon. For example, a heating hood has been placed over a previously ground, still porous convex surface of a round mirror, this hood producing on the mirror surface a temperature of 1550° C. to 1600° C. There resulted a bubble-free fire polish that was so thick that polishing to optical quality was possible at every point thereof. Because of the low expansion of the material, this surface improvement can also be partially carried out, without producing damage in the body of the glass. Other possibilities of surface improvement are offered, for example, by the application of a thin surface layer of the same glass of optical quality by vaporization, hydrolysis or fusion.

The manufacture of large optical articles, such as mirrors, for example, whose dimensions are such that they cannot be cut in one piece from the raw glass block, can be conducted for example in the following manner.

Blanks are sawed from the raw glass block in the desired thickness and shape (so as to produce equilateral hexagons for mirrors, for example) and fitted together in the final shape, which can be held together by a band clamp so that the edges of the individual pieces are pressed lightly against one another. The pieces are then welded together by means of a torch flame, while the light pressure produced by the band clamp acts on the seams between the individual pieces. Thereafter the solid, finished blank can be ground, processed and polished. It is not necessary that the adjoining edge surfaces be joined together in the polished state; fine grinding followed by thorough cleaning suffices to produce a weld of good quality. The material behaves better under the flame than vitreous silica or quartz glass. Another way of joining the individual parts into the finished blank is for example by heating the entire surface of a blank in final form composed of loose parts.

The following examples are given to illustrate specific embodiments of the present invention.

EXAMPLE 1

A ten-liter round flask equipped with a "KPG" agitator, spherical condenser and thermometer was charged with a mixture of 2230 ml. $Si(OCH_3)_4$ and 403 ml. $Ti(OC_4H_9)_4$ (=91% $SiO_3$+9% $TiO_2$). This mixture was heated under constant agitation thereof to a temperature of about 40 to 50° C. In order to achieve better intermixure, the batch was vacuum boiled for 30 minutes under reflux.

Water was sprayed into the flask through a thin tube fastened above the ball condenser. The addition of water was continued until a gel developed. Shortly before gelation took place, the temperature started to rise and the mixture started to foam. Gelation took place almost directly after the addition of 750 ml. of water. The flask was opened and the agitator was immediately removed therefrom. The gel was allowed to harden and cool, and then it was crushed and boiled in water. The gel had to be boiled for at least two hours.

The boiled gel was then dried for 12 hours at 100° C., thereafter for 12 hours at 200° C., and finally heated at 1230° C. for 24 hours. The resulting material was finely crushed and fired for at least 24 hours at 1600° C., to provide a solid mass.

The final product was colorless. The expansion amounted to $0 \pm 0.1 \times 10^{-7}/°$ C. (20 to 300° C.).

EXAMPLE 2

A 10-liter round flask provided with a "KPG" agitator and a dropping funnel was charged with a mixture of 4470 ml. of $Si(OCH_3)_4$ and 1440 ml. $Ti(OC_2H_5)_2Cl_2$ (=91% $SiO_2$ +9% $TiO_2$). The mixture was stirred for about 2 hours but was not boiled. About 3 liters of water were then allowed to drip into the flask while the contents were cooled and stirred. The further processing of the gel was carried out as described under Example 1.

EXAMPLE 3

447 ml. $Si(OCH_3)_4$ and 144 ml. $Ti(OC_2H_5)_2Cl_2$ were poured into a tall 5-liter beaker. The mixture was stirred, cooled and about 300 ml. of water were then introduced. The gel formation did not take place until several hours had elapsed. The further processing of the gel was carried out as described in Example 1.

EXAMPLE 4

A 10-liter round flask, equipped with a "KPG" agitator, a ball condenser and a thermometer, was charged with 4460 ml. of $Si(OCH_3)_4$, and the contents were then heated to 40 to 50° C. Water (about 1500 ml.) was sprayed into the flask through a thin tube located above the ball condenser. The further processing of the gel was carried out as described in Example 1. The final product was a pure $SiO_2$ glass having a thermal expansion coefficient of 5 to $7 \times 10^{-7}$ per ° C.

EXAMPLE 5

89.1 grams of $Al(OC_4H_9)_3$ were added with strong agitation to 4000 ml. of $Si(OCH_3)_4$ contained in a 10 liter upright cylindrical vessel and the contents heated. Thereafter $CaCl_2$ (426.4 g.), $MgCl_2$ (139.5 g.) and $NaCl$ (656.6 g.) were added in succession in the form of their aqueous solutions. The hydrolysis was carried out under strong evolution of heat. Further processing according to Example 1 produced a glass whose physical and chemical properties were the same as those of commercial sheet glasses.

EXAMPLE 6

In a 10 liter upright cylindrical vessel, 490.3 grams of $Al(OC_4H_9)_3$ were added with strong agitation and under heating to 4130 grams of $Si(OCH_3)_4$. Thereafter, 42.8 g. of $CaCl_2$, 131.8 g. of $BaCl_2$, and 231.1 g. of $NaCl$ were added successively and in that order in the form of their aqueous solutions. Then with strong agitation 306.7 grams of $H_3BO_3$ dissolved in hot water were added. The hydrolysis took place with strong evolution of heat. Further processing was carried out as set out in Example 1 and resulted in a borosilicate glass having a thermal expansion coefficient of $50 \times 10^{-7}$ per ° C.

We claim:
1. In the process for the production of molded bodies of high melting multi-component silicate glass having a low thermal expansion which comprises forming a mixture of the components of such glass, liquefying such and forming such liquid into said molded body, the improvement which comprises the steps of forming such mixture in liquid form utilizing at least one of the principal components thereof in the form of a liquid hydrolyzable metal organic compound; incorporating therewith a solution of a non-hydrolyzable compound which is convertible to an inorganic glass-forming oxide; subjecting the resultant mixture to conditions sufficient to hydrolyze at least said metal organic compound, gelling the hydrolyzed mixture; and then subjecting the resultant gel to the action of heat of a temperature at least sufficient to produce an oxidic form of said mixture; and forming said oxidic mixture into said molded body.

2. A process according to claim 1 wherein said hydrolysis is discontinued shortly before gelation takes place whereby forming a partially hydrolyzed mixture, subjecting the partially hydrolyzed mixture to comminution, with said comminution being carried out as a micronization, and simultaneously completing the hydrolysis thereof, thereafter decanting the completely hydrolyzed product and subjecting such to the action of heat thereby producing said oxidic molded body.

3. A process according to claim 1 wherein said glass components forming said mixture comprise $Al(OC_4H_9)_3$, $Si(OCH_3)_4$, $CaCl_2$, $MgCl_2$, and $NaCl$ in a concentration corresponding to the oxidic composition of a common plate glass or sheet glass.

4. A process according to claim 1 wherein said glass components forming said mixture comprise $Al(OC_4H_9)_3$, $Si(OCH_3)_4$, $CaCl_2$, $BaCl_2$, $NaCl$ and $H_3BO_3$ in a concentration corresponding to the oxidic composition of a common borosilicate glass.

5. A process according to claim 1, wherein said non-hydrolyzable compound is an alkali metal chloride, alkaline earth metal chloride or boric acid.

6. A process according to claim 1, wherein at least two principal components of the final glass are utilized in the form of a liquid hydrolyzable metal organic compound, said metal organic compounds being metal alcoholates, metal halogen alcoholates or metal esters.

7. A process according to claim 1, wherein said gel is allowed to harden, is then comminuted, boiled in water, washed with water and then degassed by heating to a temperature below the sintering temperature, wherein said degasification is not carried out to completion, resulting in the formation of a bubble containing glass body having either closed or opened pores on its surface, said surface of said bubble containing glass body is subjected to grinding, said surface is then heated and thereafter polished to produce a glass of optical quality.

References Cited

UNITED STATES PATENTS

| | | | |
|---|---|---|---|
| 2,856,268 | 10/1958 | Young | 23—182 |
| 3,007,806 | 11/1961 | Hartwig | 106—50 |
| 3,017,282 | 1/1962 | Brill | 106—299 |
| 3,098,861 | 7/1963 | Russell | 106—299 |
| 3,131,087 | 4/1964 | Paquet | 106—299 |
| 2,326,059 | 8/1943 | Nordberg | 106—52 |
| 2,106,744 | 2/1938 | Hood et al. | 106—54 |
| 3,459,673 | 8/1969 | Best et al. | 252—301.4 |

FOREIGN PATENTS

| | | | |
|---|---|---|---|
| 18,053 | 1/1912 | Great Britain | 106—52 |
| 725,656 | 3/1955 | Great Britain | 106—50 |

OTHER REFERENCES

Morey, G. W., The Properties of Glass, Reinhold Publishing Corp., New York 1954, pp. 80–82.

Smoke, E. J. and Bersch, C. F., Hydrogen and Vacuum Firing, in The Ceramic Age, April 1965, pp. 103 and 104.

Roy, R., Aids in Hydrothermal Experimentation: 11, Methods of Making Mixtures for Both "Dry" and "Wet" Phase Equilibrium Studies, in Journal of the American Ceramic Society, vol. 39, No. 4, pp. 145–146, April 1956.

Luth, W. C. and Ingamells, C. O., Gel Preparation of Starting Materials for Hydrothermal Experimentation, in The American Mineralogist, vol. 50, pp. 255–258, Jan.–Feb. 1965.

Iler, R. K., The Colloid Chemistry of Silica and Silicates, Cornell University Press, Ithaca, N.Y., 1955, pp. 75 and 138.

TOBIAS E. LEVOW, Primary Examiner

M. L. BELL, Assistant Examiner

U.S. Cl. X.R.

65—17